Figure 15:
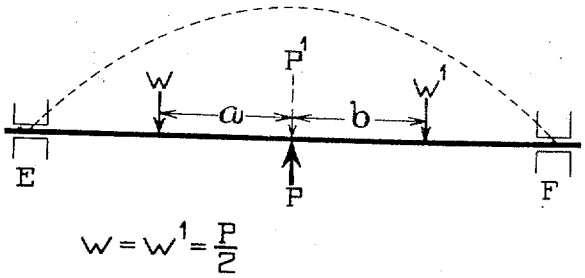

S. I. FEKETE.
BALANCED CRANK SHAFT.
APPLICATION FILED JAN. 8, 1917.
Reissued Apr. 24, 1917.
14,292.
3 SHEETS—SHEET 1.
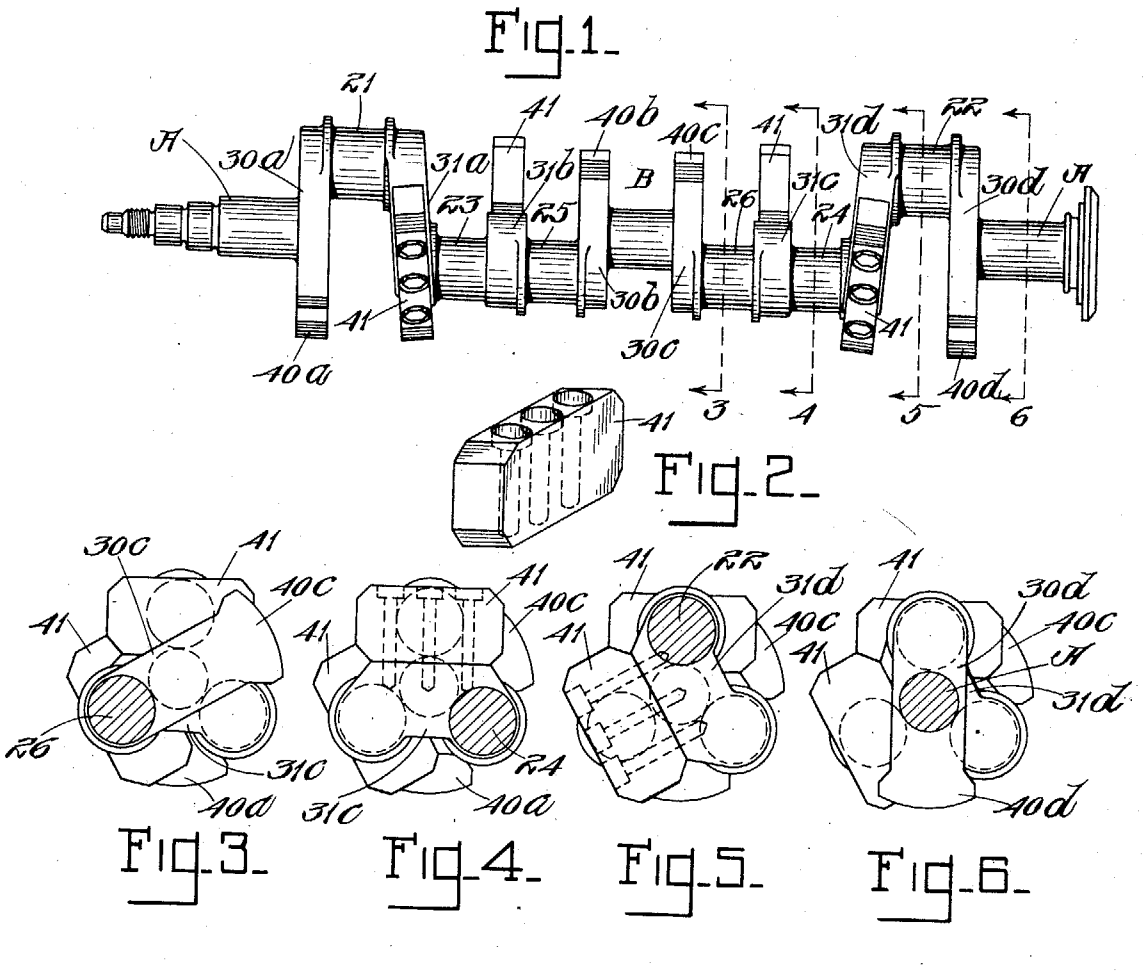
INVENTOR:
Stephen I. Fekete
by Macleod, Calver, Copeland & Dodge.
Attys.

S. I. FEKETE.
BALANCED CRANK SHAFT.
APPLICATION FILED JAN. 8, 1917.
Reissued Apr. 24, 1917.
14,292.
3 SHEETS—SHEET 2.
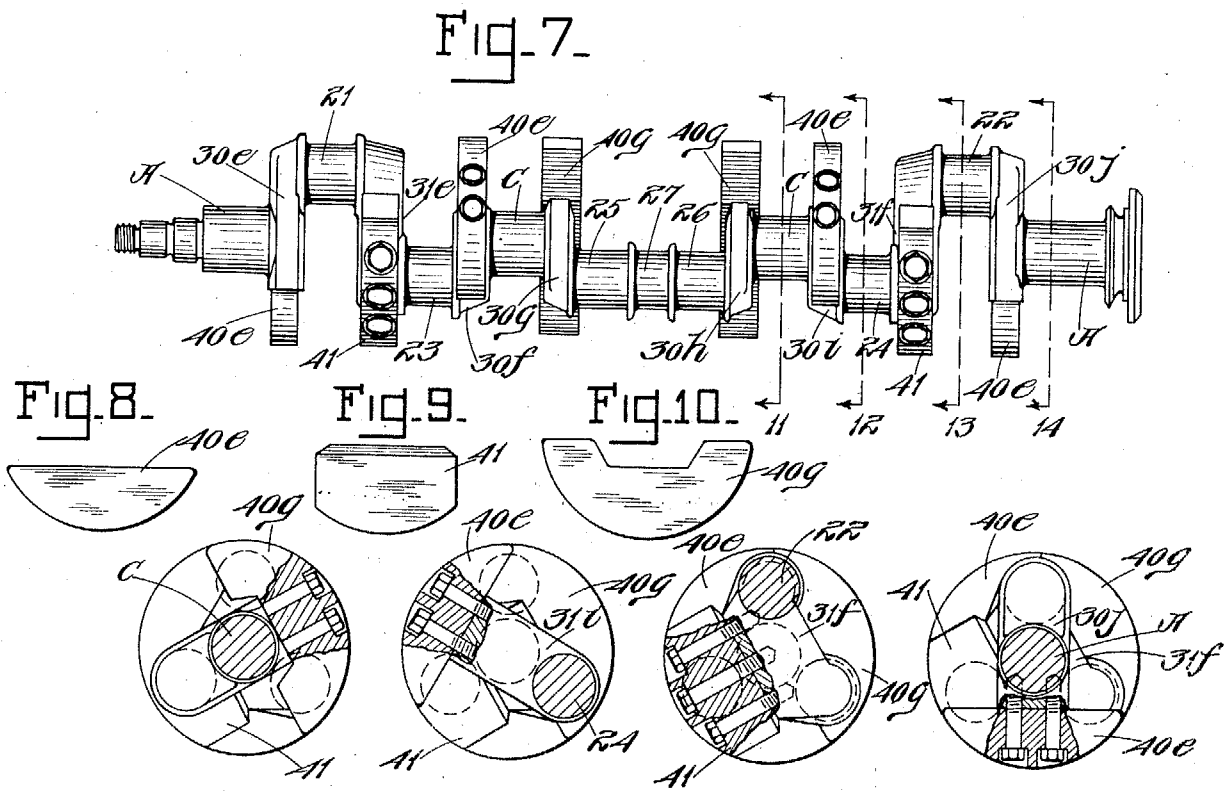
INVENTOR:
Stephen I. Fekete
by Machold, Colby, Copeland & Dibb.
Attys.

S. I. FEKETE.

BALANCED CRANK SHAFT.

APPLICATION FILED JAN. 8, 1917.

Reissued Apr. 24, 1917.

14,292.

3 SHEETS—SHEET 3.

INVENTOR:

Stephen I. Fekete by Macleod, Calver, Copeland & Dike.

Attys.

UNITED STATES PATENT OFFICE.

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

BALANCED CRANK-SHAFT.

14,292. Specification of Reissued Letters Patent. Reissued Apr. 24, 1917.

Original No. 1,165,861, dated December 28, 1915, Serial No. 36,602, filed June 28, 1915. Application for reissue filed January 8, 1917. Serial No. 141,299.

*To all whom it may concern:*

Be it known that I, STEPHEN I. FEKETE, a citizen of the United States, residing at Detroit, in the county of Wayne and State of Michigan, have invented certain new and useful Improvements in Balanced Crank-Shafts, of which the following is a specification, reference being had therein to the accompanying drawings.

The fundamental object of this invention is to substantially eliminate those vibrations and noises of a six-cylinder internal combustion engine which have heretofore been incident to running the engine at high speed; and to also increase the horse power of such engines; although it is applicable to any multithrow crank shaft whose crank pins are symmetrically arranged around the crank shaft in more than two radial planes and includes long crank arms which connect together two adjacent crank pins.

The invention is based upon the ascertainment that such vibrations and noises, and a considerable loss of efficiency, in such engines, as they are constructed, are due almost entirely to improper balancing of the six-throw crank shaft which such engines must and do have.

An ordinary six-throw crank shaft with the crank pins lying in radial planes 120° apart, is substantially in static balance. But when such a crank shaft is mounted in three bearings, or four bearings only, that is, two end bearings, and either one or two intermediate bearings, and is constructed so that it may be so mounted, the lack of dynamic balance, or, more particularly, that feature of dynamic balance involving the question of distortion of the shaft, has been vaguely appreciated but the means which have heretofore been proposed for remedying the defects have been effectual in only a very small degree. In fact, I do not believe that any one had any conception that a three or four bearing six-throw crank shaft, as ordinarily constructed, could be responsible for any considerable part of the vibration and noises developed by a six cylinder engine running at high speed, until I discovered the facts by a long series of research experiments. Much less did any one suppose that any mere change in the construction of such a crank shaft could increase the horse power efficiency of such an engine in any considerable degree.

The static balance of an ordinary six-throw crank shaft is due to the fact that the offcenter weights are distributed equally and symmetrically around the axis of the crank shaft, but these offcenter weights are connected with the shaft at different points lengthwise of said shaft. Therefore, when the shaft is in rotation, the centrifugal forces generated pull the shaft in different directions at different points in its length. When the speed of the shaft increases so that these forces can overcome the bending moment of the shaft each one of these forces will produce shaft deflection, and the shaft is no longer in balance *i. e.* deflection balance. The components of these centrifugal forces, acting on the shaft at different points along its length, so coact that at each point lengthwise of the shaft there are forces which are not balanced, and which tend to distort the shaft, and in fact, do distort the shaft spirally. Moreover, these forces are constantly changing in direction with respect to the bearings in which the shaft rotates; and this constantly unbalanced reaction, ever changing in direction, has a destructive effect upon the bearings, more especially those intermediate of the end bearings.

The present invention remedies these defects by applying to the shaft counterbalancing weights of such magnitude and so located that they apply to the shaft a centrifugal pull sufficient to produce a tendency to deflection which is equal and opposite to that produced by the offcenter weights of the portions of the shaft which the respective counterbalancing weights counter-balance with the result that distortion of the shaft even when running at high speeds is prevented to any degree necessary in practice. The invention consists of a crank shaft having the characteristics of construction shown in the drawings, hereinafter described, and pointed out definitely in the appended claims.

Figure 16:
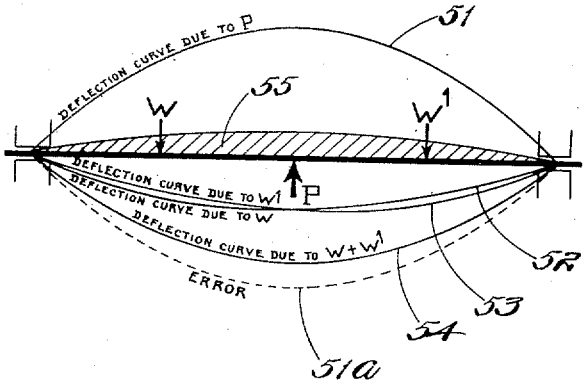
Figure 17:
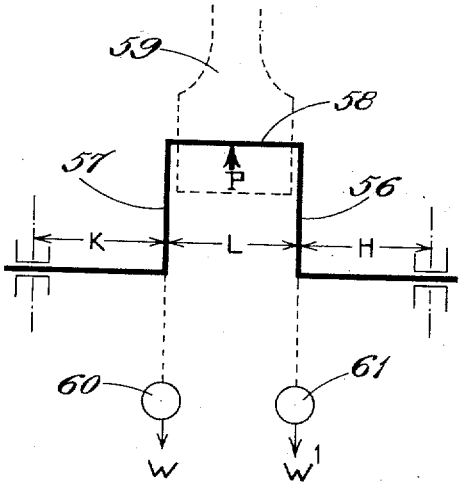
Figure 18:
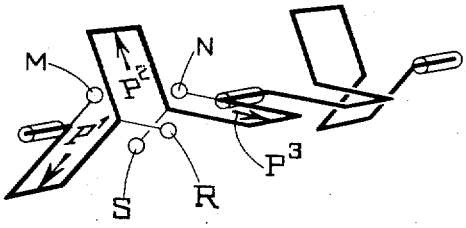
Figure 19:
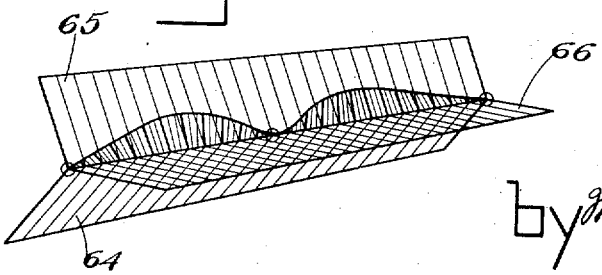

In the drawings, Figure 1 is an elevation of a three-bearing six-throw crank shaft; Fig. 2 is a perspective view of one of the counterweights which are connected with the long crank arms of said crank shaft;

Figs. 3, 4, 5 and 6 are respectively transverse sectional views on lines 3—3, 4—4, 5—5, and 6—6, of Fig. 1; Fig. 7 is an elevation of a six throw four bearing crank shaft; Figs. 8, 9 and 10 are respectively side views of counterweights which are applied as hereinafter described to said crank shaft; Figs. 11, 12, 13 and 14 are respectively sectional views on lines 11—11, 12—12, 13—13 and 14—14 of Fig. 7. Fig. 15 is a diagram illustrating the action of forces in a crank shaft having a single throw. Fig. 16 is a deflection diagram. Fig. 17 is a diagram of a crank having a single throw. Fig. 18 is a diagram of a six-throw crank carrying three bearings. Fig. 19 is a deflection diagram of a six-throw crank having three bearings such as is shown in Fig. 1.

Referring to the parts by reference characters, A A represent the end bearing portions, or, for brevity the end bearings of the crank shaft.

B represents the center bearing of the three bearing crank shaft shown on Fig. 1.

C C represent the two intermediate bearings of the four bearing crank shaft shown in Fig. 7. The crank pins 21, 22 are disposed with their axes in alinement and in the same radial plane. The crank pins 23 and 24 are disposed with their axes in alinement and in the same radial plane which lies at an angle of 120° from the radial plane which contains the axis of the two crank pins 21, 22.

The crank pins 25, 26 are disposed with their axes in alinement, and in the same radial plane,—which plane lies at an angle of 120° to each of the other two radial planes referred to. Some of these crank pins are connected with the crank shaft by short crank arms $30^a$ $30^b$, etc., while in other cases two adjacent crank pins are connected with one another by long crank arms $31^a$, $31^b$, etc. For example, in the crank shaft shown on Sheet 1, the crank pins 21, 25, 26, and 22 are connected with the crank shaft respectively by the short crank arms $30^a$, $30^b$, $30^c$ and $30^d$. In this shaft, the crank pins 21 and 23 are connected by long crank arms $31^a$; the crank pins 23 25 are connected by long crank arms $31^b$; the crank pins 26, 24 are connected by long crank arms $31^c$; and the crank pins 24, 22 are connected by the long crank arms $31^d$.

In the construction shown on Sheet 2, the crank pins 21, 23, 25, 26, 24 and 22 are connected by the crank shaft respectively by short crank arms $30^e$, $30^f$, $30^g$, $30^h$ $30^i$ and $30^j$; while the crank pins 21 and 23 are connected together by the long crank arms $31^e$ and the two crank pins 24, 22 are connected together by the long crank arms $31^f$.

A counterbalancing weight is provided for each of these crank arms and a part of one or more of the associated crank pins. By the phrase "counterbalancing weight" hereafter used in this specifiaction is meant a weight the centrifugal pull produced by which will be capable of balancing or counteracting the tendency to deflection produced by the offcenter masses composing the members which it counterbalances. The words "balance" and "counterbalance" are also used in the sense above explained.

Such counterbalancing weights are connected with the shaft at the same point as are the arms which together with a part of a crank pin they respectively counterbalance; for example, as shown on Sheet 2, a counterbalancing weight $40^e$ is connected by bolts or other suitable means with a diametric continuation across the axis of the crank shaft of the arm $30^e$, and this weight is of such size and its center of weight located at such distance from the axis of the crank shaft that at all speeds it will counterbalance the arm $30^e$ and substantially one-half of the crank pin 21. A similar weight $40^e$ is connected in like manner to a diametrically opposed continuation of the short crank arm $30^j$, so that at all speeds of rotation of the shaft it will counterbalance said short arm $30^j$ and one-half of the associated crank pin 22. A weight $40^g$ is connected with a diametrically opposed continuation of the short arm $30^g$ and it is of such weight and distance from the axis of the crank shaft that it counterbalances the short arm $30^g$ to which it is connected, the crank pin 25, and one-half of the piece 27 which is intermediate of the two crank pins 25, 26. A similar weight $40^g$ is connected in like manner with a diametrically opposed continuation of the short arm $30^h$ and it counterbalances said arm and the crank pin 26 and one-half of the part 27 intermediate of the crank pins 25 and 26.

A counterweight 41 is connected with each of the four long crank arms of this crank shaft. Its center of weight is in a radial plane 120° removed from the two crank pins which are connected by the long arm to which the weight is attached. The weight lies on the opposite side of the axis of the crank shaft from these two crank pins and it is selected and disposed so that at all speeds of the shaft it will counterbalance the deflection caused by the centrifugal pull of the offcenter weight of the long arm to which it is attached, and one-half of each of the two crank pins which said arm connects. For example, (see Sheet 2) one of said weights 41 is connected with the long crank arm $31^f$ and extends from its point of connection across the axis of the crank shaft. Its center of weight is in a radial plane of 120° removed from the radial planes in which lie the axes of the two crank pins 22, 24 and said weight 41 counterbalances the weight of the arm $31^f$ and one-half of each of the two crank pins 24, 22, which said arm connects.

In the construction shown on Sheet 1, the weights $40^a$, $40^b$, $40^c$ and $40^d$ which counterbalance each of the four short arms of this crank shaft are formed integrally with the crank shaft and said arms. Each of these weights is so located and is of such size that it counterbalances the deflection caused by the centrifugal pull of the offcenter weight of the short arm with which it is associated and one-half of the crank pin with which said short arm is connected.

The weights 41 which are connected with the long arms of this crank shaft are arranged in respect to the crank pins which said long arms connect, precisely as before explained in connection with the shaft shown on Sheet 2, and each of these weights is of such size and such distance from the axis of the shaft that it counterbalances the deflection caused by the centrifugal pull of the offcenter weight of the long arm to which it is connected and one half of each of the two crank pins which said long arm connects.

From the foregoing it will appear that each offcenter weight of the described crank shafts is completely counterbalanced at all speeds of rotation by oppositely disposed offcenter counterbalancing weight capable of producing a tendency to deflection which is equal and opposite to that produced by the offcenter weight of the corresponding crank arms and portion of the crank pins. Under these circumstances it is clear that at whatever rate the crank shaft is rotated there will be practically no distortion of the shaft produced. The disposition of the counterbalancing weights is such that static balance is maintained as well as deflection balance.

For the purpose of assisting those skilled in the art who desire to employ my invention to understand more fully the action of the forces in a crank shaft embodying my invention and to enable such persons to ascertain accurately the sizes of counterweights which are required in such a crank shaft, I will now describe the action of the forces and the method of determining the size of the weights and in so doing will refer to the diagrams composing Figs. 15, 16, 17, 18 and 19.

In Fig. 15 the straight line from E to F represents a shaft supported in bearings at these points. If a force P acting in the direction indicated is applied to the center of the shaft a deflection indicated graphically by the dotted line is produced. If a counter deflecting force P′ acting in the opposite direction to P can be applied at the point of application of the force P, it will produce an equal and opposite tendency to deflection but if the counterbalancing forces cannot be applied along the line of the force P there must be two or more counterdeflecting forces of magnitude different from P′. Therefore let it be supposed that the counterdeflecting forces W and W′ are to be applied at distances *a* and *b* from the point of application of the force P, and that W and W′ each equal P/2. This will produce static or standing balance, but as will be shown will not produce deflection balance.

In Fig. 16 there are shown the deflection curves resulting from the forces assumed. The deflection curve resulting from the force P is designated 51. The deflection curves resulting from the forces W and W′ respectively are designated 52, and 53. At 54 is shown a curve which is the deflection line produced by the sum of the forces W and W′. If the shaft were in perfect deflection balance and all tendency to deflection had been eliminated, this curve would be the same as the curve 51 resulting from the force P and be opposite to it. By superposing on the curve 54 the curve 51, the amount of the error will be seen. The deflection caused by the uncompensated forces is shown by the shaded area 55 in Fig. 16. This also represents the amount of the uncorrected force still remaining and which causes deflection of the crank shaft, the vibration produced thereby becoming apparent when a certain speed is reached. It is therefore evident that to produce a crank shaft which will have no tendency to deflection, the forces W and W′ must be increased until they become great enough to produce jointly a deflection which will be the same in amount although opposite in direction, as the deflection produced by the force P. Each of the forces W and W′ will be greater than P/2. If the point of application of either force is moved toward the adjacent bearing, the force must be increased to produce the desired effect.

Accordingly, in designing a crank shaft the amount of the offcenter mass or masses and the line or lines of action will first be determined, then the deflection line produced by the offcenter mass or masses will be ascertained, and finally the amount of the weights of the counterbalances, which, if applied along the line chosen, will produce an equal deflection will be determined.

Now referring to Fig. 17, let the force exerted by the offcenter mass of the crank shaft be considered P. This offcenter mass, *i. e.* the mass which produces the centrifugal pull will include the cheeks 56 and 57, the pin 58, and whatever part of the connecting rod is contributing to the centrifugal pull. In the drawings this is shown in dotted line at 59. The counterbalance weights are to be applied in the planes of the cheeks 56 and 57 which are at distances H and K from the bearings, H and K in this example being equal. It may also be assumed that the planes of the cheeks 56 and 57 are separated by a distance L and that the pulls exerted by the counterbalance weights are respectively W and W′ and that W and W′ are equal. Heretofore it has been customary to provide counterweights 60 and 61, each of which will exert a pull equal to P/2, but if the case be considered from the point of view of deflection, it will be seen that two forces, each P/2 in magnitude are wholly inadequate to cause an opposite tendency to deflection equal to the deflection produced by the force P because both of the forces exerted by the counterweights are applied at points nearer the bearings than is the force P. Therefore to determine the correct size of the counterweights, the deflection line produced by the force P will be determined. Then the amount of the weights necessary to produce an equal and opposite deflection will be determined. This may be done by the use of the following formulæ

$$(1)\quad y = \frac{P}{EI}\cdot\frac{c^2c_1^2}{6l}\left(\frac{2x}{c}+\frac{x}{c_1}-\frac{x^3}{c^2c_1}\right)$$

$$(2)\quad y_1 = \frac{P}{EI}\cdot\frac{c_1^2c^2}{6l}\left(\frac{2x_1}{c_1}+\frac{x_1}{c}-\frac{x_1^3}{c_1^2c}\right)$$

In these formulæ

P = Force.
$c$ = distance from P to left support.
$c_1$ = distance from P to right support.
L = $c$ plus $c_1$.
$x$ = variable distance from left support.
$y$ = deflection at $x$.
$x_1$ = variable distance from right support.
$y_1$ = deflection at $x_1$.
E = modulus of elasticity.
I = moment of inertia of section.

It will be found that in all cases the sum of the corrective forces W and W′ will be greater than the force P.

Up to this point the forces in a crank shaft having a single throw have been considered. In the design of a six throw crank shaft having pins 120° apart (see Fig. 18) the problem is not altered.

For the purposes of computation the shaft is divided at the center bearing into two halves. The deflection lines due to forces $P_1$, $P_2$ and $P_3$ are computed as before and considered in their own individual planes, 64, 65 and 66 which are 120° apart (see Fig. 19). Sections are then taken perpendicular to the axis of the shaft at frequent and equal intervals and the three deflections at each section due to the forces $P_1$, $P_2$ and $P_3$ are added vectorially giving the actual total deflection in the plane of each section. These are the deflections that are to be balanced.

Counter deflectors must be applied, for structural reasons at the cheeks connecting the crank pins. Considerations of symmetry make it evident that counterbalance weights M and N must be alike as also counterbalance weights R and S.

Counterbalance weights R and S are chosen of unit value and then counterbalance weights M and N are ascertained so that by adding vectorially the individual deflections due to the counterbalance weights in their respective planes, resultant deflections are obtained at each section which are always in the same ratio to the original deflection at that section. The counter deflection now need only be multiplied by the reciprocal of this ratio to obtain the value which will correct the shaft.

While I have shown and described my invention as embodied in a crank shaft for the ordinary six cylinder engine, I do not limit myself to this particular embodiment of my invention which I believe to be of a basic character, but claim the same broadly for any use of which it is capable.

Having described my invention, I claim:

1. In a crank shaft having a plurality of crank pins which are symmetrically disposed around the shaft with their axes lying in more than two radial planes, short crank arms which connect some of said crank pins with the shaft, long crank arms, each of which connects two adjacent crank pins, a counterweight associated with each short crank arm and connected with said crank shaft at the same point in length thereof as that to which the associated short arm is connected thereto and extended therefrom in the opposite direction, each of said counterweights producing a tendency to deflection which is equal and opposite to the tendency to deflection produced by the associated short crank arm and one half of the associated crank pin, and other counterweights each of which is connected with a long crank arm and extends therefrom across the center from the two associated crank pins and angularly equidistant from said two associated crank pins, said last named counterweights each producing a tendency to deflection which is equal and opposite to the tendency to deflection produced by the long crank arm to which it is connected and one half of its two associated crank pins.

2. A six thrown crank shaft having crank pins which are symmetrically disposed around the shaft and which consists of a plurality of balanced longitudinal sections, some sections consisting of a short crank arm and one half of an associated crank pin and an oppositely disposed counterbalancing weight which is connected with the crank shaft at the same point in the length thereof as that to which the associated short crank arm is connected, and the other sections consisting of one half of two associated crank pins and a long arm which connects said crank pins and an oppositely disposed counterbalancing weight which is connected with said long arm and is located 120° from both of the crank pins which said long arm connects and across the center of the shaft from both of said crank pins, each of said counterbalancing weights producing a tendency to deflection which is equal and opposite to that produced by the offcenter masses which it counterbalances.

3. A crank shaft having six crank pins symmetrically disposed in pairs about the shaft some of which pins are each connected with the shaft by a short crank arm and some of which are connected together in pairs by long crank arms, a counterbalancing weight fixed to each short arm and extending on the opposite sides of the axis of the crank shaft, and a counterbalancing weight which is connected with each long arm and extends therefrom to a point such that its center of weight is across the center from and is 120° removed from the axis of the two crank pins which said long arm connects, each of said counterbalancing weights producing a tendency to deflection which is equal and opposite to that produced by the offcenter masses which it counterbalances.

4. A six throw crank shaft for internal combustion engines which consists of a plurality of balanced longitudinal sections each of which sections consists of a crank arm, a part only of one or more associated crank pins, and a weight which produces a tendency to deflection which is equal and opposite to the tendency to deflection produced by the said crank arm and said part of said crank pin or pins.

5. A six thrown crank shaft which comprises a plurality of crank pins symmetrically arranged about the axis in pairs in three radial planes and which comprises a plurality of balanced longitudinal sections, each of which sections consists of a crank arm, a part only of one or more associated crank pins and a weight which produces a tendency to deflection which is equal and opposite to the tendency to deflection produced by the said crank arm and said part of said crank pin or pins.

6. A crank shaft for internal combustion engines, having crank arms, three crank pins equidistant angularly from each other associated with adjacent crank arms, said crank shaft comprising sections each of which consists of a crank arm, a part only of one or more of its said associated crank pins, and a weight which produces a tendency to deflection which is equal and opposite to the tendency to deflection produced by the said crank arm and said part of said crank pin or pins.

7. A crank shaft having rotating working parts constituting offcenter masses, which by centrifugal force tend to deflect the crank shaft between its bearings, combined with counterbalancing weights the amount and location of which are such as to produce an equal and opposite tendency to deflect said crank shaft between the bearings.

STEPHEN I. FEKETE.